Patented Jan. 27, 1931

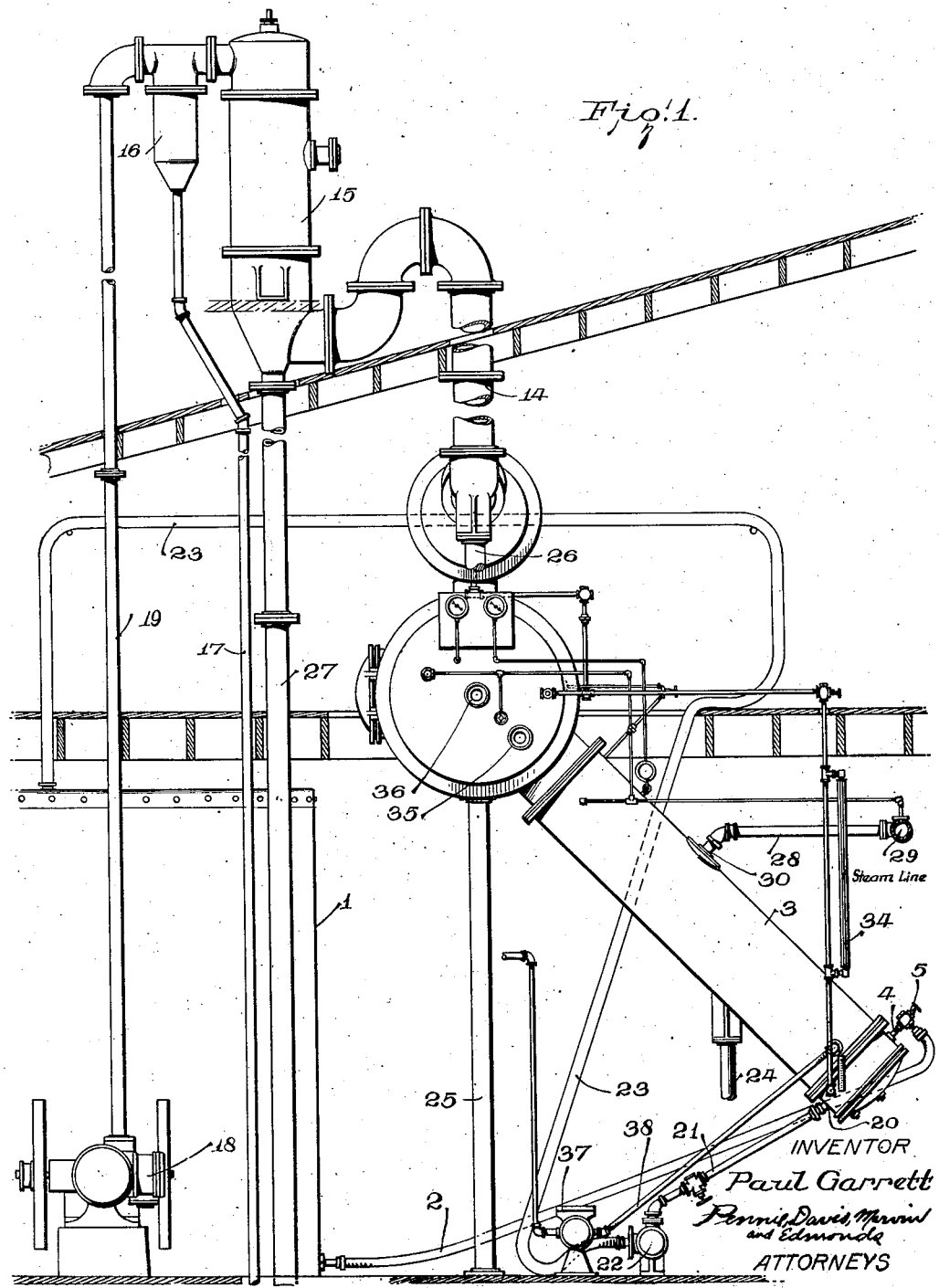

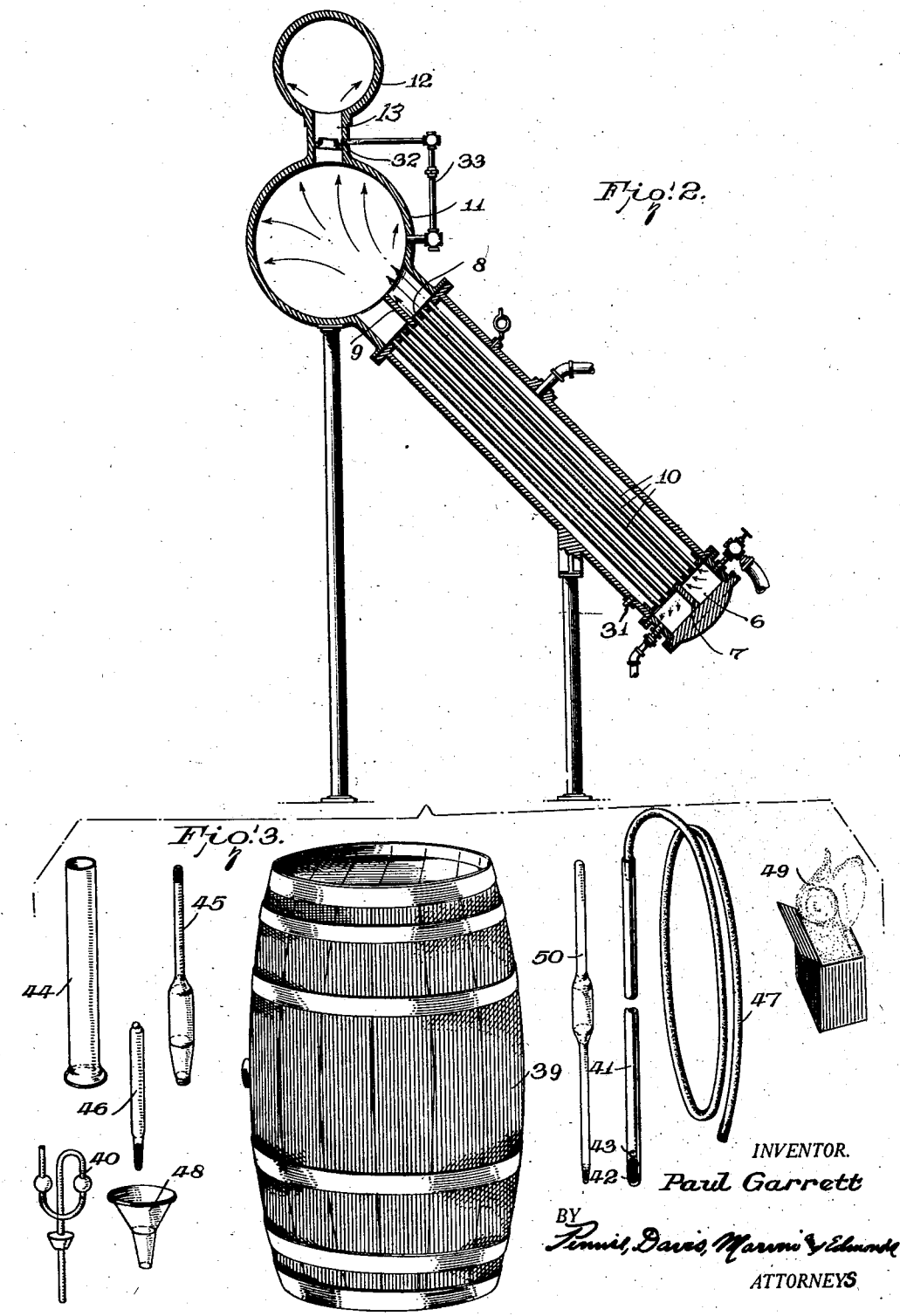

1,790,140

UNITED STATES PATENT OFFICE

PAUL GARRETT, OF NEW ROCHELLE, NEW YORK

CONCENTRATED FRUIT JUICE AND METHOD OF MAKING THE SAME

Application filed February 14, 1927. Serial No. 168,165.

This invention relates to concentrated fruit juice, the method of making the same, and the manufacture of beverages from such concentrated fruit juice.

For many years unfermented beverages prepared from fruit juices have been upon the market, and these beverages, in order that they remain unfermented, were usually so treated either by the addition of sugar or other preserving matter, or by a pasteurizing treatment, that no fermentation or other chemical changes occurred. While these treatments of the juice from which the beverages were made did prevent the fermentation thereof and other major chemical changes, a very serious problem developed as a result of such treatment. It was found that the pasteurizing not only somewhat altered the aroma, but it also seriously altered the taste, so that the beverages failed to have a natural fresh fruit taste. In addition to these objectionable characteristics, the physical reactions were not identical with those of the juices from freshly pressed fruit. Such a problem also existed where the juice was treated with preserving matter, particularly with sugar, for the sugar had to be present in large quantities, and therefore the treated juice was in the nature of a syrup.

Cider has been considered in the past a a very popular unfermented beverage, but after the cider is permitted to stand in the open for a comparatively short time, it begins to ferment and soon is so changed that it develops into what has been usually termed "hard" cider. As stated above, the fermentation can be avoided by pasteurizing the apple juice, but such pasteurizing treatment results in an unnatural flavor which makes this treatment very undesirable. In view of this condition many attempts have been made to so treat cider that it will stand for a long period of time without becoming "hard", but because of the difficulty encountered in pasteurizing, chemicals have been added which do affect the tendency of the cider to ferment. However, the usual chemicals employed are considered harmful to the consumer, and the use thereof has been strictly limited. Of course, any chemical present in sufficient quantities to prevent fermentation and other chemical changes would be expected to affect the natural flavor, which is quite as objectionable as the cider becoming hard. The chemicals which aid in preventing fermentation obviously interfere with the action of the digestive properties in the juice, and this feature alone makes the use of such chemicals undesirable.

The problems that were encountered in the shipping and storing of apple juice, have been to a large extent encountered in the shipping and storing of grape, berry, and like juices. Despite the altered taste of the grape juice which has heretofore been in commercial use, it is one of the most popular unfermented beverages. The commercial use of grape juice has, however, been greatly restricted largely because of the altered taste, and in addition because it does not assimilate in digestion like the fruit juices when unpasteurized, these objectionable characteristics necessarily existing as a result of the previous methods of treatment. With the view of increasing the market for fruit juice of this character, or at least opening up the natural market therefor in view of its popularity, attempts have been made to place the freshly extracted juice in sealed containers with the view of keeping it airtight during shipping and storage, and primarily for the purpose of preventing fermentation or other chemical changes. Such method of shipping and storing does prevent the formation of a substantial amount of alcohol, when the juice so packed is maintained at a somewhat low temperature, probably because of the presence of the pressure which is created by carbon dioxide within the container, this gas being a secondary product of the alcoholic fermentation, but the method is quite expensive and more or less impractical because it does not fully perform the function for which it is intended. There is always a possibility of fermentation developing to some degree, because the carbon dioxide does not form without at least some fermentation, and this may result in rupture of the containers because of high pressure developing therein.

If the slightest fermentation develops the natural aroma and taste are altered.

Prior to my invention, so far as I am aware, there had been no method devised by which unfermented fruit juice, such as cider or grape juice, and the like, could be satisfactorily shipped and stored in a commercial way, unless this cider or juice was so treated by heat or with a chemical that no fermentation was possible during such shipping and storing, which treating always affected the natural aroma and taste. The large market for unfermented fruit juice is not only present in the manufacture of beverages, but the unfermented juice is often used by the housewife in the making of sauces, jellies, nursery food, beverage adjuncts, sauces for meats, dressings for ice cream, etc., as well as in the form of a syrup.

Difficulties have been encountered not only in the fruit juices that are used in the manufacture of unfermented products, but also when the juice is fermented, primarily because the consumer has been unable to control in any way the alcoholic content of the fermented juice. In the manufacture of fermented fruit juice it has been the custom to first press the fruit to extract the juice, or to permit the juice to percolate from the crushed fruit, and to thereafter place the juice in containers where it is permitted to stand for a long period. During this period tests are made as to the quality of the beverage being produced, the color, aroma and the degree of fermentation, being carefully noted. In such manufacture it was not unusual for the juice to be permitted to ferment over a period of twenty (20) months, and after the fermentation had ceased, to clarify the same with albumin, whereupon it was ready to be bottled or otherwise packed and shipped for consumption. These tests were made necessary because the fermentation of juices in different containers which were apparently the same in every respect and were subjected to the same temperature, would develop at an entirely different rate so that no uniformity could be assured. Nevertheless, by constant expert testing and blending it was possible to grade the beverages so that a consumer would be able to purchase a fairly uniform product. By the methods formerly practiced, the consumer always purchased a fully fermented juice and the alcoholic content was therefore relatively large. It was impossible for the consumer in any way to control the alcoholic content, as the fermentation had to be carried out immediately after the extraction of the juice from the fruit.

I have discovered that apple, grape and similar fruit juices may be concentrated to a degree where they become self-preserving. In addition to the concentration even to a high degree, my method also involves what may be called, for want of a better term, selective sterilization, that is, it appears to involve the destruction or removal of undesirable organisms while desirable ferments or organisms are only rendered dormant and can be subsequently revived upon dilution under favorable conditions, whereupon these "fittest" organisms which survive perform their functions better in every respect than when not treated by my method.

While the objects of my invention will be manifest from the specification and the accompanying drawings, one of the principal objects of the same is to produce a fruit juice in a condition which renders it self-preserving. This invention also contemplates the production of fruit juice in this form in which the natural flavor of the fruit from which the juice is extracted is substantially unaltered, and still contains all its elements which in sound fermentation develop the fine esthers and aromas of vintage years.

Another object of the present invention is the production of a fruit juice product which is self-preserving in concentrated form, but which will become a fermentable product upon mere dilution.

A further object of the present invention is to prepare a fruit juice for subsequent use as a beverage, the original juice expressed from the fruit being concentrated and accordingly reduced in volume so that it can be shipped at a lower weight rate and thereafter at a distant point consumed in its concentrated form, made into an unfermented beverage, or permitted to ferment upon the addition of a suitable liquid, the character of the fruit juice in this form being derived from the concentration which holds inactive those organisms not previously destroyed.

Attempts have been made heretofore to concentrate apple juice and other fruit juice with the view of reducing the volume of the juice and, as a result thereof, the cost of shipping, but such concentration has either been developed by a heat treatment, in which the heat alters the natural aroma and taste, or by means of a freezing treatment. The freezing treatment does remove a portion of the water, but only a comparatively low concentration can be obtained thereby. Some freezing processes have been practiced with the view of removing some of the water content of the juice, and as a result increasing the percentage of solid content, intending thereby to increase the alcoholic percentage of a beverage made from this concentrated juice. However, such methods have not proven satisfactory, and the products resulting from the freezing methods have not been self-preserving. Furthermore, concentration of the juices by either the freezing or the ordinary boiling methods, has not produced a concentrated juice in which a selective sterilization has taken place.

By way of illustration I have selected one type of apparatus in which the fruit juice may be concentrated in vacuum and at a temperature which will in no way affect the desirable organisms. The concentrated fruit juice thus produced in this apparatus will retain its natural aroma, flavor and color, and it is believed that the undesirable organisms present in the juice before concentration are either destroyed or else removed during the concentration treatment. This apparatus, which is preferred by me in the practicing of my method, is illustrated in the accompanying drawings, wherein Figure 1 is an elevation of a complete concentrating system;

Fig. 2 is a longitudinal sectional view through the vacuum pan; and

Fig. 3 is a view of one form of concentrated juice container, together with the various instruments utilized during the fermentation of a diluted juice if the concentrated juice is used for this purpose.

Referring to the drawings in detail, the numeral 1 indicates a storage tank of rather large capacity, in which the bulk of the fruit juice under concentration treatment is normally contained.

Leading from the tank 1 at a point adjacent the lower end thereof is a pipe 2 which may be in the form of a flexible hose, with a proper end connection. The other end of the pipe 2 is attached to the lower end of the evaporating vessel 3 by means of a connection 4 provided with a valve 5.

The vessel 3 in the preferred form is provided adjacent the connection 4 with a header 6, Fig. 2, and this header 6 is divided centrally and longitudinally of the vessel 3 by means of a separating plate 7, the purpose of which will be hereinafter fully described.

Another header 8 is arranged at the opposite end of the evaporating vessel, and this header is divided similarly to the header 6 by means of a plate 9. Tubes 10 are arranged between the headers 6 and 8, and these tubes are divided into two series. The tubes are arranged with respect to the headers so that one series thereof connects the uppermost compartments of headers 6 and 8 for conducting the juice therebetween, while the other series connects the lowermost compartments of the respective headers.

Secured to the vessel 3 at the upper end thereof is a chamber 11, which is in full communication with each of the compartments of the header 8, and the separating plate 9 terminates in a plane with the wall of the chamber 11.

Vertically arranged above the chamber 11 is a trapping compartment 12, which is in communication with the chamber 11 through the medium of a connection 13. A pipe connection 14 is arranged at the top of the compartment 12, being connected to the upper part of a side wall thereof, for permitting the outflow of water in the form of vapor as it is being drawn therethrough, and this connection 14 leads to a barometric condenser 15 wherein the vapors are condensed and permitted to pass into an airline separator 16, and thereafter through a pipe 17 to a sewer. If desired, the water vapor after it is condensed may be collected so that it can be later added to the concentrated juice for the purpose of diluting the same, in which case it would not be permitted to waste to a sewer. In the handling of certain juices such as orange juice, it will be necessary to have condensers for the collection of aromatic oils, etc., which may be later added to the concentrate for flavoring the same.

A pump for maintaining a vacuum through the system is shown at 18, and the connection by means of which it is in communication with the system beyond the airline separator 16 is illustrated at 19.

An outlet 20 from the vessel 3 through which the juice under treatment is adapted to pass, is arranged in the lower compartment of the header 6, and this outlet 20 is connected to a suction pump 22 by means of a pipe 21 which may, like the pipe 2, be flexible. Leading from the discharge end of this pump is a pipe 23 similar to pipe 19, which is in direct communication with the upper portion of the tank 1.

For maintaining the elements of the system in their resective positions, supports 24, 25, 26 and 27 are provided, the lower ends of which supports may be embedded in concrete.

The details of this apparatus as illustrated in the drawings, may be more readily understood upon a consideration of my method as practiced therein, but it is to be understood that my invention is directed primarily to the method of concentrating juices, the concentrated product, and to the manufacture of beverages, independent of the particular apparatus or system employed.

In practicing my method, I first take fresh, selected, ripe apples, berries, grapes, or the like, and extract the juice from the same either by crushing the fruit and percolating the juice therefrom, or by expressing it from the pulp of the fruit. If red fruit is employed and a red product is desired, the skins may be heated slightly and pressed to extract the coloring matter therefrom, such coloring matter being largely present in the skins. This coloring matter is then added to the juice, after which the juice may be clarified to remove sediment. Normally I prefer not to clarify the juice at this time, as there is a tendency by the clarification to remove much desirable matter, and therefore lower the quality of the final product when it is made into the form of a beverage; particularly is there danger of removing some of the ferment foods which, of course, are desirable if the concentrated product made from the juice is later to be diluted for the purpose of making a fermented beverage. It is preferable to retain the germ foods in the juice rather than to clarify the latter, as either the substances themselves or the products resulting from the action of the germs which thrive on such foods are responsible for the fine esthers or aromas of a fermented beverage which characterizes its appeal to the senses of taste and smell.

At a convenient time after obtaining the juice as above indicated, and preferably before any fermentation has started, the juice is subjected to a concentration treatment preferably in an apparatus such as disclosed in the accompanying drawings.

In practicing my method in this apparatus, the storage tank 1 is filled and the valve 5 of the connection 4 partially opened, which permits the juice to flow through the pipe 2, the valve 5 and connection 4 into the upper compartment of header 6. The pump 18 having been started, a vacuum is created in the entire system, which vacuum is preferably raised to about 28 inches, or even higher when practical. While this vacuum may be raised or lowered somewhat, it is desirable and I have found it necessary to maintain a high vacuum through the system during the treatment of the juice. At this point, steam is permitted to pass through pipe 28 from the steam-line 29 through a connection 30 arranged in the wall of the vessel 3. The steam as it escapes into the vessel quickly surrounds the tubes 10, and as the steam condenses in the vessel the condensate is permitted to be discharged through an outlet 31.

The steam as it is admitted through the connection 30, is at such a rate that the juice flowing through the tubes 10 between the upper compartment of the header 6 and the upper compartment of the header 8 is not raised materially above 100° F. I have found that it is best to maintain the juice under treatment at about 95° or 100° F. Because of the maintenance of a vacuum throughout the system, it is possible at this very low temperature to cause an ebullition of the juice, which ebullition is exaggerated if the juice is violently agitated. As the pump 18 is connected to the system at the extreme end thereof, there is always a pull on the liquid in the tubes 10, and this pull results in the liquid being drawn rather rapidly through the tubes between the upper compartments of the headers 6 and 8, and as the juice escapes from the upper end of these tubes a violent agitation occurs and the juice assumes the condition of a dense mist or spray. By so breaking up the juice into small particles, the pull of the vacuum is exerted on these particles so that the water content is quickly removed therefrom. This comparatively quick vaporization of the water and the immediate exhaust due to the vacuum tends to purify and cleanse the juice, and my theory is that the weaker and undesirable organisms and bacteria which may tend to lower the fermentation quality of the juice if not removed therefrom, are cause to explode, or else to be removed through the vacuum pump, very much as chaff is winnowed from grain, leaving in the concentrated syrup only the stronger organisms, or at least those organisms which result in a quick and uniform fermentation. Regardless of what happens during this treatment, I have found that the concentrated juice which is prepared in accordance with the present invention, when diluted and permitted to stand, will ferment uniformly, and that fermentation will be wholly completed in as short a period as six days. Therefore, this new product is the result of the present method regardless of any theory which is used as an attempt to explain its characteristics. By practicing my method in the machine which I have described I have found that there is no noticeable loss of the natural flavor of the apples or grapes.

The water vaporizes more readily than the remaining components of the juices, and therefore this water vapor is drawn upwardly through the connection 13 and into the collecting compartment 12. The heavier components of the juice, because of the force with which they pass from the tubes 10, strike the wall of the chamber 11 and flow down the wall and collect in the lower portion thereof. As these heavier components are collected they are drawn downwardly through the tubes 10 arranged between the lower compartments of the headers 6 and 8, and then outwardly by means of the pump 22 from which the juice is forced upwardly through pipe 23, where it is led back to the upper part of the tank 1 and there mingled with the rest of the juice under treatment. This operation is continued and the juice in the tank 1 circulated from the tank into and through the system and then back to the tank until it is reduced to a consistency preferably just prior to the crystallizing point. I have found that it is usually proper to concentrate to about 80° Balling, although there are some juices which are sufficiently concentrated at 60° or 70° Balling, while others can be carried to 90° Balling. When the juice is concentrated to a point just prior to the crystallizing point, the natural sugar therein acts as a preservative so that the concentrated juice will not ferment or otherwise change chemically until it is diluted. I find that the juice so concentrated may be rendered fermentable by mere dilution and preferably by the addition of three parts of tepid water to one part of concentrated juice, the three parts of water being substantially the same as the amount of water removed from the juice during the concentration treatment.

As the water vapor passes upwardly through the connection 13 and into the compartment 12, there is usually still present therein some of the higher boiling point components of the juice, but these components largely condense within the compartment 12 and flow down the wall thereof into the connection 13 to the gutter 32, from which gutter it may pass through the reflux pipe 33 back into the chamber 11 where it is permitted to commingle with the juice collected at the lower end thereof and thereafter passed through the tubes 10 with this juice to the outlet pipe for further circulation.

The water vapor is then drawn upwardly through the pipe 14 and into the barometric condenser 15, and is then passed therefrom in the form of a liquid to the airline separator 16, from which this liquid is discharged. If desired, the water vapor may be condensed and collected and this condensed water utilized for the subsequent dilution of the concentrated fruit juice. The utilization of such condensed water may be desirable in communities where the natural water is hard or has a high mineral content, or might interfere with or alter the character of the diluted fruit juice, or interfere with proper fermentation if fermentation is desired.

A water gauge 34 is arranged between the lower and upper end of the vessel 3 so that the liquid in the tubes 10 and the chamber 11 will be indicated thereon. Sight openings 35, 36 are arranged in the side wall of the chamber 11 so that the action of the juice as it is discharged from the upper end of the tubes 10 between the uppermost compartments of the headers 6 and 8, may readily be detected and the apparatus adjusted accordingly.

If it is desirable in view of the action of the juice flowing from the tubes 10 into the chamber 11, a force pump 37 may be utilized to create a greater flow through these tubes. This force pump 37 is connected by means of a pipe 38 to the uppermost compartment of the header 6.

In Figure 3 I have illustrated a cask which may be employed if a fermented beverage is to be produced from the concentrated juice. This cask 39 may be one-quarter filled with the concentrated juice, whereupon it is only necessary in order to produce a fermented beverage to add tepid water until the cask is substantially filled, some space being left for an air space.

The U-tube or trap 40 is then inserted in the opening in the cask, which when the cask is on its side is the bung-hole. This tube is provided for the purpose of permitting the escape of gas which passes upwardly through the vertical tube and then downwardly through the water or sealing liquid in the U-shaped portion thereof and then outwardly to the atmosphere. By using such a tube it is impossible for external germs to become active in the juice and thereafter affect the taste or character of the fermented beverage. A withdrawal tube 41 which is provided with a solid projection 42 at the lower end thereof and an opening 43 in its side, spaced from the lower end thereof in communication with its central bore, is inserted through the opening and a portion of the liquid under treatment withdrawn and placed in the container 44. By having the opening 43 spaced from the end of the withdrawal tube 41, any sediment in the cask is not disturbed by the withdrawal of the liquid. The partially or completely fermented juice, as the case may be, is tested in the container 44 by means of the hydrometer 45, and if fermentation is not proceeding properly, the temperature of the room may be noted on the thermometer 46 and changed accordingly for the purpose of aiding the proper fermentation, the optimum temperature being about 70° F. or slightly lower. The hose 47 is adapted for use in connection with the withdrawal tube 41, so that the liquid can be conveyed for properly filling the container or other containers.

After fermentation has progressed to the desired degree, the test portions are returned to the cask and, for this purpose, it is convenient to employ a funnel 48. In order to prevent inoculation of the beverage or the test portions with contaminating organisms as well as to prevent the addition of dirt or foreign substances thereto, it is preferable to make use of cotton 49 as a stopper for container, instead of using an ordinary cork. A pipette 50 may be employed during the testing of the partially fermented juices in place of the withdrawal tube 41. However, all of these various elements referred to are well known in the art of making fermented beverages.

I claim:

1. A concentrated fruit juice product having organisms therein capable of effecting fermentation, and being of a degree of concentration capable of inhibiting the fermentation thereof, said concentrated fruit juice being characterized by the fact that upon being diluted by the addition of three parts water to one part of concentrate it will ferment substantially completely in a period not exceeding six days when subjected to favorable fermentation conditions.

2. A concentrated fruit juice product derived from normally extracted unclarified fruit juice, containing organisms capable of effecting fermentation under favorable conditions, but being concentrated to a degree where it is self-preserving, and being characterized by the fact that a more rapid fermentation period will be had upon dilution of the concentrate with water to substantially the same consistency of the juice before concentration, than that required to effect fermentation of the normally extracted fruit juice immediately after extraction.

3. A concentrated fruit juice product derived from normally extracted unclarified fruit juice, containing organisms capable of effecting fermentation under favorable conditions but having a sufficient sugar content to render it self-preserving, and being characterized by the fact that upon being diluted by the addition of three parts of water to one part of concentrate it will ferment substantially completely in a period not exceeding six days, and further characterized by the fact that upon dilution substantially the natural aroma and flavor of the juice before concentration will exist in the diluted product.

4. A method of preparing a concentrated fruit juice product which comprises subjecting normal fruit juice extracted from the fruit and before the development of substantial fermentation to a temperature, to violent agitation, and to a vacuum, each of which conditions is sufficient in combination to produce a concentrate having the characteristic that upon being diluted by the addition of three parts of water to one part of concentrate it will ferment substantially completely in a period of shorter duration than the period required for the fermentation of a similar fruit juice before concentration, and that the fruit juice in the concentrated condition is self-preserving.

5. A method of preparing a concentrated fruit juice product which comprises subjecting normally extracted fruit juice before fermentation to a temperature between 95° to 120° F., to intermittent agitation, and to a vacuum of substantially 28 inches for a period of time sufficient to effect a concentration under such conditions to a degree in excess of 60° Balling but less than a period of time at which the fruit sugar crystallizes, whereby the fruit juice is rendered self-preserving but not completely sterilized.

6. A method of preparing a concentrated fruit juice product which comprises maintaining a bulk of grape juice before substantial fermentation has developed, effecting the treatment of a portion of the juice mentioned in bulk for concentrating the same, which treatment includes passing the said portion of juice through a zone to cause it to be of a temperature between 95° F. and 120° F., subjecting the portion to the action of vacuum while at the temperature specified and causing the portion to assume the formation of a mist while subjected to the vacuum to thereby remove a portion of the moisture, and collecting the remaining portion of the juice and returning it to the bulk.

7. A method of preparing a concentrated fruit juice product which comprises maintaining a bulk of grape juice before substantial fermentation has developed, effecting the treatment of a portion of the juice mentioned in bulk for concentrating the same, which treatment includes passing the said portion of juice through a zone to cause it to be of a temperature between 95° F. and 100° F., subjecting the portion to the action of vacuum while at the temperature specified and causing the portion to assume the formation of a mist while subjected to the vacuum to thereby remove a portion of the moisture, collecting the remaining portion of the juice and returning it to the bulk, and continuing the cycling of the juice from the bulk until all of the juice in bulk is reduced to a concentrate above 60° Balling.

In testimony whereof I affix my signature.

PAUL GARRETT.